United States Patent [19]

Kinsinger

[11] Patent Number: 5,005,920

[45] Date of Patent: Apr. 9, 1991

[54] TRACK ADJUSTING MECHANISM

[75] Inventor: Malcolm H. Kinsinger, Washington, Ill.

[73] Assignee: Caterpillar Inc., Peoria, Ill.

[21] Appl. No.: 499,234

[22] Filed: Mar. 26, 1990

[51] Int. Cl.⁵ .............................................. B62D 55/30
[52] U.S. Cl. ........................................ 305/10; 305/31
[58] Field of Search .................. 305/10, 29, 31, 32; 188/305; 267/34, 174, 175, 286; 137/329.3; 180/9.1

[56] References Cited

U.S. PATENT DOCUMENTS

| 2,818,311 | 3/1956 | Ashley, Jr. | 305/10 |
| 3,101,977 | 8/1963 | Hyler et al. | 305/10 |
| 3,409,335 | 11/1968 | Piepho et al. | 305/10 |
| 3,511,327 | 5/1970 | Schlor | 180/6.7 |
| 3,647,270 | 5/1972 | Althaus | 305/10 |
| 3,733,107 | 5/1973 | Cote et al. | 305/10 |
| 3,765,730 | 10/1973 | Ishida | 305/10 |
| 3,901,563 | 8/1975 | Day | 305/10 |
| 3,910,649 | 10/1975 | Roskaft | 305/10 |
| 3,972,569 | 8/1976 | Bricknell | 305/10 |
| 4,149,757 | 4/1979 | Meisel, Jr. | 305/10 |
| 4,457,564 | 7/1984 | Ruge et al. | 305/10 |
| 4,681,376 | 7/1987 | Riml | 305/10 |
| 4,712,469 | 12/1987 | Hesse | 91/422 |
| 4,887,872 | 12/1989 | Adams et al. | 305/10 |

FOREIGN PATENT DOCUMENTS

| 491513 | 2/1976 | U.S.S.R. | |
| 1306796 | 4/1987 | U.S.S.R. | 305/10 |

Primary Examiner—Russell D. Stormer
Attorney, Agent, or Firm—Cluade F. White

[57] ABSTRACT

A track adjusting mechanism establishes the optimum tension in the endless track assembly of a track type vehicle. The track adjusting mechanism is controlled by the vehicle operator from the operator's station. The adjusting mechanism includes a fluid cylinder, a piston movable within the cylinder, and a hydraulic circuit to supply fluid to the cylinder. Fluid leakage from the cylinder is collected and stored in an accumulator. A single fluid line in the hydraulic circuit serves as a high pressure line to the cylinder in a first mode and a low pressure drain line from the cylinder in a second mode. The accumulator is also connected to this single fluid line and a one-way check valve prevents high pressure fluid from entering the accumulator while allowing the low pressure leakage fluid to pass through and reach the low pressure drain line.

9 Claims, 3 Drawing Sheets

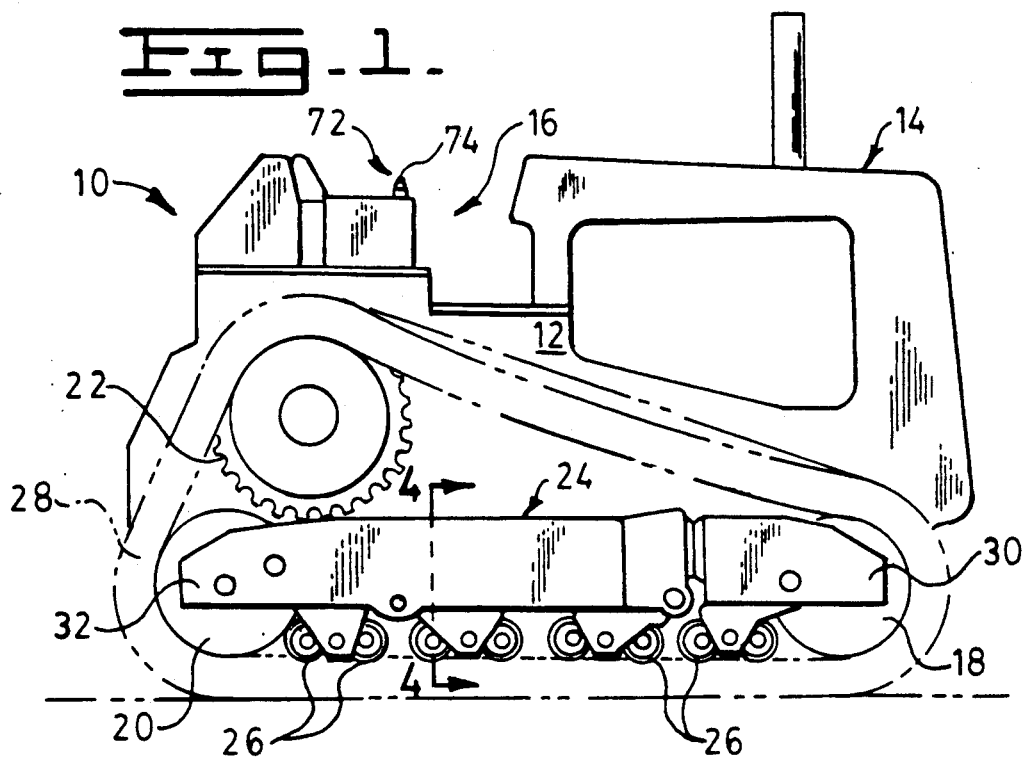
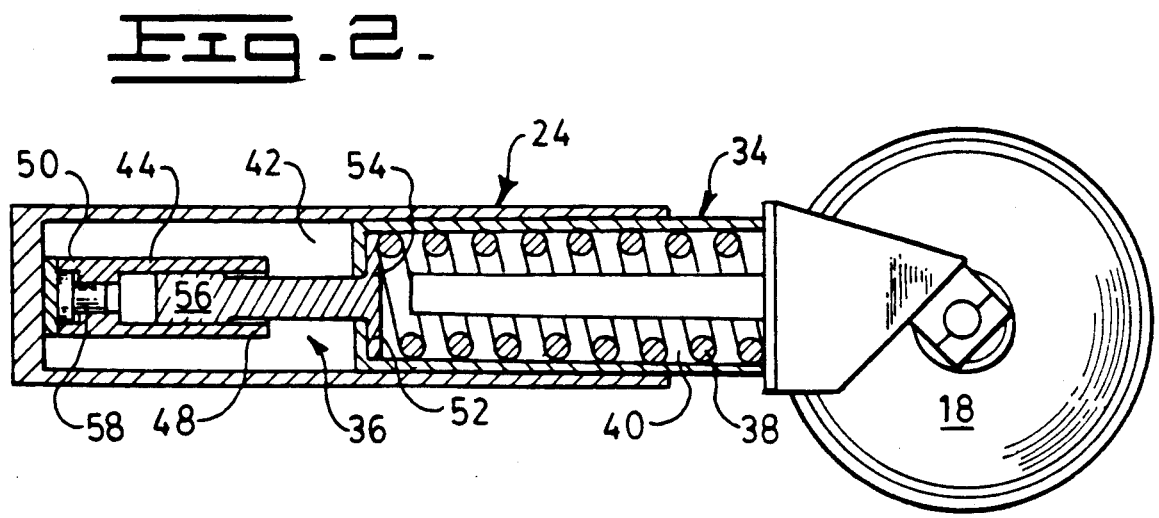

TRACK ADJUSTING MECHANISM

TECHNICAL FIELD

This invention relates generally to a track adjusting mechanism for the endless track of a track-type vehicle and more particularly to such a mechanism utilizing a single fluid line which receives high pressure fluid in a first operational mode and relatively low pressure fluid in a second operational mode.

BACKGROUND ART

Self-laying track-type vehicles utilize endless loop track assemblies to support and propel the vehicle. The track assembly is typically driven by a toothed sprocket, supported by a plurality of roller wheels, and guided and reversed by one or more large idler wheels. In order to operate effectively, the endless loop track assembly must be tensioned to a specific force. This tension force must be maintained within optimum limits to prolong the useful life of the track assembly.

If the tension force on the track assembly is lower than optimum, the track becomes slack and sags excessively between the drive sprocket and the idler wheel. Such excess slack produces accelerated wear of the track and associated components and generates undesirable noise levels. Excess slack can also cause the track to become disengaged from the drive sprocket. Higher than optimum track tension force produces a tight track which is also detrimental to long track life. An excessively tight track also produces accelerated wear and can cause fracture of the track and related components.

Conventional track adjusting mechanism and procedures require the machine operator, or a separate maintenance person, to manually measure the track sag and then manually adjust the sag accordingly. Such procedures generally require removal of a cover plate to gain access to the track adjusting mechanism. The adjusting mechanism is conventionally a small track adjusting fluid cylinder, into which a non-compressible fluid is applied by a manually operated pump. Proper track tensioning by this procedure often requires several track measurements and fluid applications. Should the track inadvertently become over tightened by this process, a separate procedure is necessary to drain off some of the excess pressure in the track adjusting fluid cylinder.

Because of the time and effort required to properly adjust the track using the above noted procedures, track adjustment is often neglected. The working environments and inclement weather often make the track adjustment task an unpleasant one, which also promotes neglect of the procedure.

Another problem associated with previous track adjusting mechanisms relates to the collection of relatively low pressure leakage fluid from a fluid cylinder and the return of such fluid to a fluid reservoir. Prior systems utilized one fluid line for directing high pressure fluid to a fluid cylinder and another distinct fluid line to return the leakage fluid to the reservoir. This not only required additional lines and connections but required guards to protect the lines from damage.

One type of track tensioning apparatus, which does not require the manual manipulations set forth above, is disclosed in U.S. Pat. No. 4,681,376 issued July 21, 1987, to Peter Riml. The apparatus in this patent includes two fluid cylinders interconnected by a fluid passage with a floating piston positioned in the rear fluid cylinder. The piston divides the rear cylinder into two chambers, and a source of fluid pressure is connected to the rear chamber. The source of fluid pressure includes a control valve, a plurality of fluid conduits, and a plurality of check and throttle valves. The floating piston has a spring loaded check valve which opens when pressurized fluid is applied to the chamber behind the piston. Pressurized fluid flows through the floating piston into the forward chamber and into the forward fluid cylinder. Because of a differential pressure within the rear cylinder, the floating piston is forced to move toward the forward cylinder and displaces a track chain tensioning piston within the forward cylinder in order to tension the track chain. Subsequent interruption of the pressurized fluid to the floating piston, and rearward movement of the chain tensioning piston relaxes the track chain to its adjusted condition. Although this apparatus would appear to function satisfactorily to set a desired tension in a track assembly, it includes a rather complex hydraulic circuit having a large number of check valves, throttle valves and fluid lines.

Another type of track tensioning apparatus for hydraulically tensioning the chain of a tracklaying vehicle is disclosed in U.S. Pat. No. 3,647,270 issued Mar. 7, 1972, to Ernst Althans. This apparatus utilizes a hydraulic system, including a fluid cylinder and accumulator, to tension the chain and also to absorb recoil of the idler guide wheel. Besides the fluid accumulator, the hydraulic system includes a pump, a plurality of check valves and pressure limiting valves, and a plurality of interconnected fluid lines. Initial recoil forces are absorbed by the hydraulic system and subsequent higher recoil forces are absorbed by a pair of springs. Although this apparatus would appear to tension the chain to some desired tensioning pressure, it does not provide for a controlled slack in the chain. This system is also complex and includes several hydraulic components.

The present invention is directed to overcoming one or more of the problems as set forth above.

DISCLOSURE OF THE INVENTION

In one aspect of the present invention, a mechanism for adjusting the tension in the track of a track-type vehicle includes a track roller frame having first and second portions with the first portion being slidably movable relative to the second portion. The mechanism further includes first and second portions of the roller frame, and an endless track entrained around the wheels and the roller frame. A compressed spring is positioned within the first portion of the roller frame and biases the first wheel away from the second wheel. A first piston is positioned within the first portion of the track roller frame and is movable to vary the degree of compression of the spring. A cylinder, which has a fluid leakage port, is contained within the second portion of the track roller frame and a second piston is positioned within the cylinder. In a first operational mode, high pressure fluid is communicated to the cylinder through a fluid line and in a second operational mode, the fluid line receives low pressure fluid from the cylinder and the fluid leakage port.

Proper tension of the endless loop track assemblies of track-type vehicles prolongs the useful life of the track components, as well as the service life of related machine components. To maintain the proper tension, or controlled sag, of the track assembly, periodical measurements must be taken and subsequent adjustment procedures accomplished. Because the measuring and adjustment tasks are unpleasant and require considerable time and effort, these tasks are often ignored or delayed. This results in accelerated and excessive wear of the track and other machine components.

Additionally, previous track adjusting mechanisms required two fluid lines, one for communicating high pressure fluid to the adjusting cylinder, and another separate line for returning low pressure leakage fluid to a fluid reservoir. These two lines required additional guards to protect them from damage.

The subject invention provides a solution to the above noted problems by using a single fluid line for both high pressure fluid and low pressure leakage fluid. An accumulator and a check valve are utilized in combination with the single fluid line in providing a solution to the problem.

BRIEF DESCRIPTION OF THE DRAWINGS

FIG. 1 is a diagrammatic side elevational view of a track-type vehicle incorporating the track adjusting mechanism of the present invention;

FIG. 2 is a diagrammatic side elevational view, partly in section, and an enlarged scale, of the front idler wheel and track adjusting mechanism of the vehicle shown in FIG. 1;

BEST MODE FOR CARRYING OUT THE INVENTION

Figure 3:
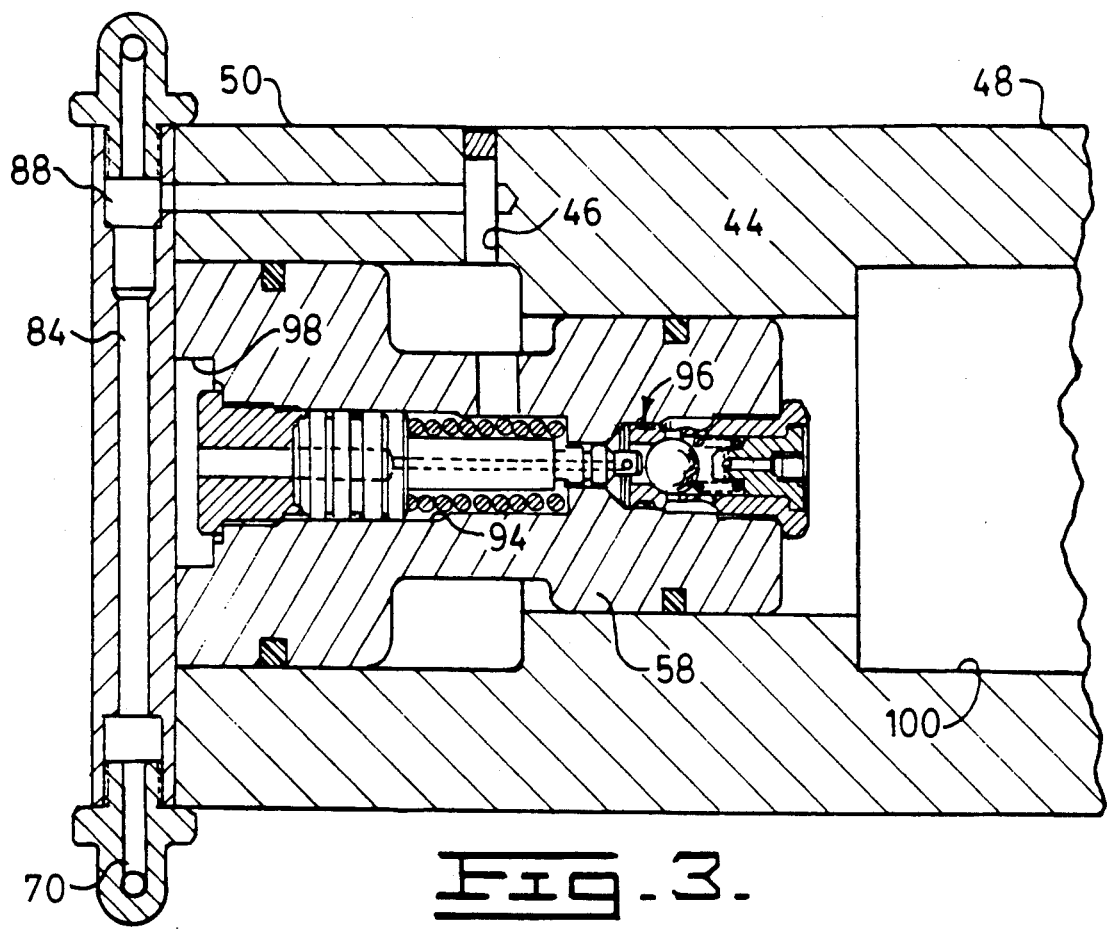
FIG. 3 is a diagrammatic sectional view, on an enlarged scale, of a flow control mechanism shown in FIG. 2.
Figure 4:
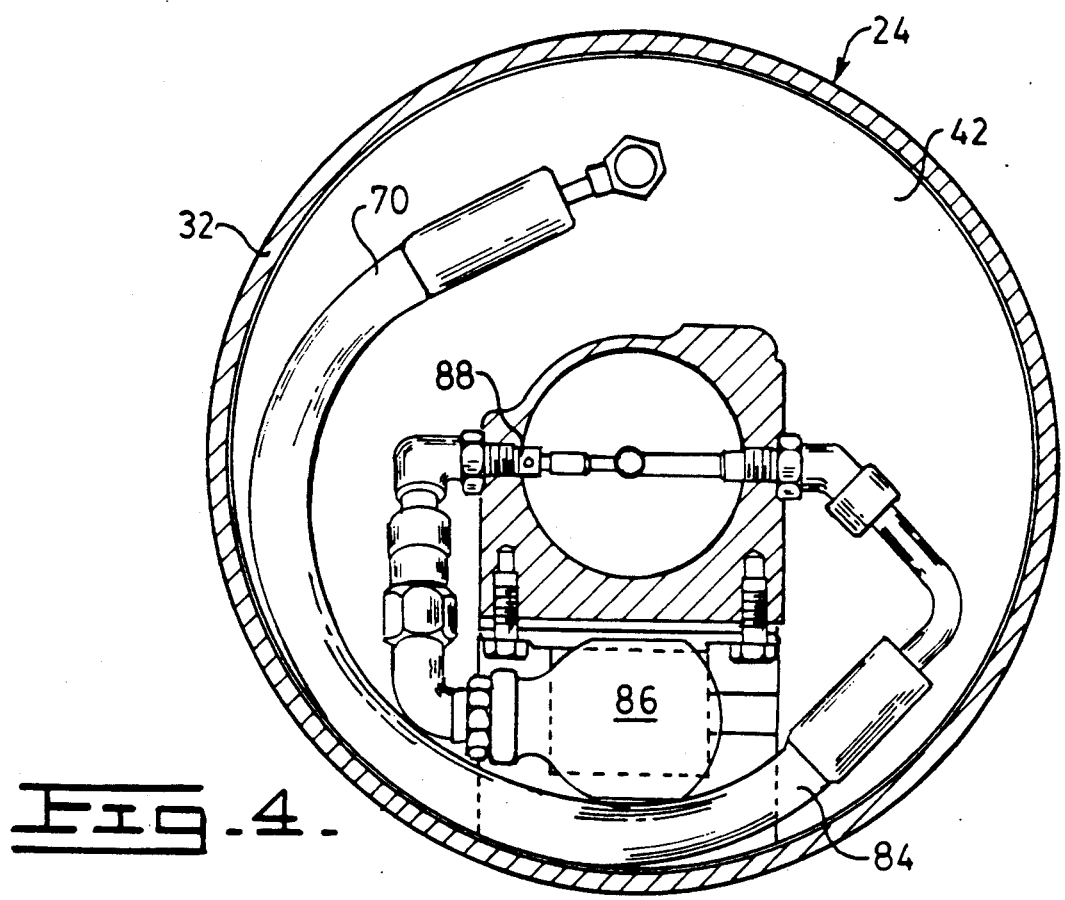
FIG. 4 is a diagrammatic sectional view taken generally along lines 4—4 of FIG. 1.

With reference to the drawings, and in particular FIGS. 1 and 2, a track-type vehicle 10 has a frame 12, an engine 14, an operator's station 16, first and second idler wheels 18, 20, a drive sprocket 22, a track roller frame assembly 24, a plurality of guide rollers 26, and an endless track assembly 28 entrained around the roller frame assembly 24, the guide rollers 26, the idler wheels 18, 20, and the sprocket 22. It is to be understood that many of the vehicle components, including the idler wheels 18, 20, the sprocket 22, the roller frame assembly 24, the guide rollers 26, and the endless track 28 are duplicated on the side of the vehicle 10 not shown. Since these duplicate components operate in the same manner as those shown and described, the description and operation of the components illustrated applies to both sides of the vehicle 10.

The track roller frame assembly 24 has first and second portions 30, 32, with the first portion 30 being slidably movable relative to the second portion. The first and second idler wheels 18, 20 are rotatably connected respectively to the first and second portions 30, 32 of the track roller frame assembly 24. The roller frame assembly 24 encloses a track recoil assembly 34, and a track adjusting mechanism 36, which adjusts the tension in the endless track assembly 28. A compressed spring 38 is positioned within the first portion 30 of the track roller frame assembly 24 and biases the first idler wheel 18 away from the second idler wheel 20. The first and second portions 30, 32 define respectively first and second chambers 40, 42, and the compressed spring 38 is positioned within the first chamber 40.

With particular reference to FIGS. 2, 3, 4, and 5, a fluid cylinder 44 is contained within the second portion 32 of the track roller frame assembly 24, and more specifically within the second chamber 42. The cylinder 44 has a fluid leakage port 46, and first and second end portions 48, 50. A first piston 52 has a head portion 54 and a rod portion 56, with the head portion 54 positioned within the first chamber 40 and the rod portion 56 positioned within the first end portion 48 of the fluid cylinder 44. The head portion 54 is in contact with the spring 38 and the degree of compression of the spring 38 is varied by reciprocally moving the piston 52. A second piston 58 is movably positioned within the second end portion 50 of the fluid cylinder 44.

A source of pressurized fluid, including a fluid pump 60 and a fluid reservoir 62, supplies pressurized fluid to the fluid cylinder 44 for moving the second piston 58. Control means 64, including a variable position control valve 66, controls the flow of pressurized fluid between the fluid pump 60 and the fluid cylinder 44. The control valve 66 is in fluid communication with the pump 60 by a first fluid line 68 and is in fluid communication with the cylinder 44 by a second fluid line 70. The operational position of the valve 66 is controlled by a control means 72, which is located within the operator's station 16. The control means 72 is preferably in the form of a control switch 74 which sends a signal to a solenoid 76 to shift the control valve 66 from a second operational position 78 to a first operational position 80.

The second fluid line 70 has a first end portion 82 connected to the control valve 66 and a second end portion 84 connected to the fluid cylinder 44. The second fluid line 70 is adapted to receive high pressure fluid from the control valve 66 when the valve 66 is in the first operational position and to receive low pressure fluid from the fluid cylinder 44 when the valve 66 is in the second operational position.

A fluid accumulator 86 is in fluid communication with the leakage port 46 and collects and stores leakage fluid from the cylinder 44. A one way check valve 88 has first and second end portion 90, 92 with the first end portion 90 being in fluid communication with the accumulator 86 and the second end portion 92 being in fluid communication with the second end portion 84 of the second fluid line 70. In the second operational position 78 of the control valve 66, the second fluid line 70 receives fluid from the accumulator 86 as well as fluid from the cylinder 44. In this operation mode, the fluid from the accumulator 86 flows through the check valve 88. In the first operational position 80 of the control valve 66, the one way check valve prevents flow of pressurized fluid therethrough. The check valve 88 and the accumulator 86 are contained within the second end portion 32 of the track roller frame assembly 24, and preferably within the second chamber 42.

With particular reference to FIGS. 1, 2, and 3, the second piston 58 has a stepped bore 94 therethrough and a pressure sensitive valve assembly 96 is positioned within the stepped bore 94. The valve assembly 96 controls the flow of pressurized fluid between a chamber 98 and a chamber 100. Pressurized fluid in the chamber 100, and movement of the second piston 58 toward the chamber 100, produces a change in the tension of the track assembly 28.

Figure 5:
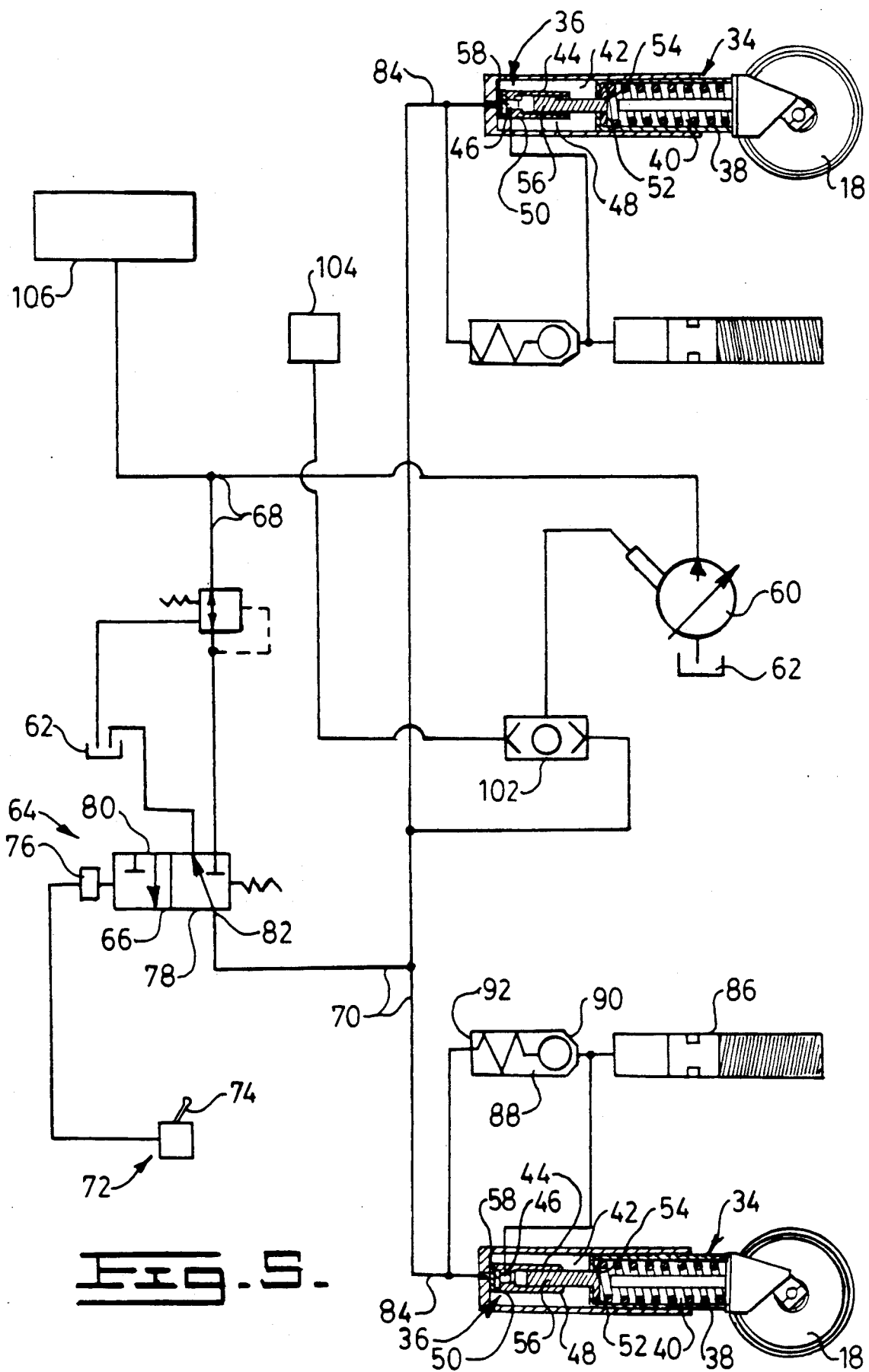
FIG. 5 is a schematic view of a hydraulic circuit used to operate the track adjusting mechanism of the present invention.

Referring particularly to FIG. 5, the hydraulic system includes a resolver valve 102, an auxiliary control valve 104, and an auxiliary work system 106, such as implement and steering motors. The resolver valve 102 is shifted by a fluid signal from either the control valve 66 or the auxiliary control valve 104. The amount of fluid delivered by the pump 60 is determined by which signal the resolver valve 102 receives.

INDUSTRIAL APPLICABILITY

With reference to the drawings, the subject track adjusting mechanism 36 is particularly useful for adjusting the tension in the endless track assembly 28 of a track type vehicle 10. The track adjusting mechanism 36 is controlled by the vehicle operator from the operator's station 16. Maintaining proper track adjustment prolongs the operating life of the endless track assembly 28 and related components, including the idler wheels 18, 20, the guide rollers 26, and the drive sprocket 22.

When the vehicle operator decides to adjust the tension in the track assembly 28, he activates the control switch 74, which is conveniently located within the operator's station 16. The switch 74 sends a signal to the solenoid 76, which shifts the control valve 66 to the first operational position 80. Pressurized fluid flows from the pump 60 through the control valve 66 and into the line 70. This fluid also flows to the resolver valve 102 and shifts the valve 102 to allow the fluid to reach the pump control and adjusts the pump 60 to the proper flow requirements. The pressurized fluid flows through the line 70 to the fluid cylinder 44 and to the one-way check valve 88. The fluid flows into the chamber 98 but cannot flow through the check valve 88.

The pressurized fluid flows through the valve assembly 96 and into the chamber 100. When the pressure in chambers 98 and 100 is essentially equal, the second piston 58 moves toward the chamber 100. This movement of the second piston 58 produces movement of the first piston 52 against the spring 38, which moves the idler wheel 18 against the endless track assembly 28 and removes substantially all slack from the track assembly 28. At this time, the control switch 74 is de-activated, which also de-activates the solenoid 76, and the control valve 66 shifts to the second operational position 78. The fluid line 70 and the chamber 98 are now connected to the reservoir 62, which relieves the pressure in the chamber 98, and the pressure in the chamber 100 moves the second piston toward the chamber 98, which establishes the proper tension in the endless track assembly 28.

While pressurized fluid is flowing into the chamber 98 and through the valve assembly 96, small amounts of fluid leak past the second piston 58 and the valve assembly 96. This leakage fluid flows through the leakage port 46 and into the fluid accumulator 86, where it is collected and stored. At this time, the leakage fluid cannot flow through the check valve 88 because the fluid pressure on the second end portion 92 exceeds the fluid pressure on the first end portion 90. As noted above, when the control valve 66 is shifted to the second operational position 78, the fluid line 70 is connected to the reservoir 62 and line 70 becomes a low pressure drain line. The pressure on the second end portion 92 of the check valve 88 is also relieved and the leakage fluid, which has been stored in the accumulator 86, flows through the check valve 88, into line 70, and back to the reservoir 62. The leakage fluid from the accumulator 86 mixes with the fluid draining from the chamber 98 and both sources of low pressure fluid use the same fluid line 70 to reach the reservoir 62.

Other aspects, objects, and advantages of the present invention can be obtained from a study of the drawings, the disclosure, and the appended claims.

I claim:

1. A track adjusting mechanism for adjusting the tension in the track of a track-type vehicle comprising:
   a track roller frame having first and second portions slidably movable relative one to the other;
   first and second wheels connected respectively to said first and second portions of said roller frame, said track being entrained around said first and second wheels and said roller frame;
   means for biasing said first wheel away from said second wheel, said means including a compressed spring positioned within said first portion of said track roller frame;
   means for varying the degree of compression of said spring, including a first piston reciprocally movably positioned within said first portion of said track roller frame;
   a fluid cylinder having a fluid leakage port for receiving low pressure leakage fluid, said cylinder being contained within said second portion of said track roller frame;
   a source of pressurized fluid and means for controlling the flow of said pressurized fluid between said source and said fluid cylinder, said means including a variable position control valve;
   a second piston positioned within said cylinder and being movable by said pressurized fluid;
   means for collecting and storing said low pressure leakage fluid from said cylinder, said means being in fluid communication with said fluid leakage port; and
   a fluid line connected between said control valve and said cylinder, said fluid line adapted to receive high pressure fluid from said control valve in a first operational position of said control valve, and to receive relatively low pressure fluid from said cylinder and low pressure leakage fluid from said collecting means in a second operational position of said control valve.

2. The track adjusting mechanism, as set forth in claim 1, wherein said vehicle includes an operator's station, said station having a control switch for controlling the position of said control valve.

3. The track adjusting mechanism, as set forth in claim 1, wherein said fluid collecting means includes a fluid accumulator.

4. The track adjusting mechanism, as set forth in claim 1, including a check valve in fluid communication with said fluid line, said check valve preventing flow of fluid therethrough in said first operational position of said control valve and allowing flow of fluid therethrough in said second operational position of said control valve.

5. The track adjusting mechanism, as set forth in claim 4, including a fluid accumulator in fluid communication with said check valve.

6. The track adjusting mechanism, as set forth in claim 5, wherein said check valve and said accumulator are contained within said second portion of said track roller frame.

7. A mechanism for adjusting the tension in an endless track of a track type vehicle comprising:
   a track roller frame assembly having first and second end portions, said first end portion being slideably received within said second end portion, said first and second end portions defining respectfully first and second chambers;

first and second wheels rotatably connected respectively to said first and second end portions of said roller frame, said endless track encircling said roller frame and said wheels;

biasing means for using said first wheel away from said second wheel, said biasing means positioned within said first chamber;

a first piston having a head portion and a rod portion, said head portion positioned within said first chamber and in contact with said biasing means;

a cylinder having a fluid leakage port and first and second end portions, said cylinder being contained within said second chamber, and said fluid leakage port being adapted to receive low pressure leakage fluid from said cylinder;

a source of pressurized fluid, including a fluid pump, and a control valve in fluid communication with said pump and said cylinder;

a second piston positioned within said cylinder second end portion, and said rod portion positioned within said cylinder first end portion, said second piston being movable by said pressurized fluid;

a fluid line having a first end portion connected to said control valve and a second end portion connected to said cylinder, said fluid line adapted to receive high pressure fluid from said control valve in a first operational mode, and to receive low pressure fluid from said cylinder and low pressure leakage fluid from said fluid leakage port in a second operational mode;

a check valve having first and second end portions, said second end portion being in fluid communication with said fluid line second end portion; and a fluid accumulator in fluid communication with said check valve first end portion, and with said fluid leakage port.

8. The mechanism, as set forth in claim 7, wherein said check valve and said accumulator are contained within said second end portion of said track roller frame.

9. The mechanism, as set forth in claim 7, wherein said vehicle includes an operator's station, said station having control means for controlling the position of said control valve.

* * * * *